Dec. 21, 1937.　　R. C. NEWHOUSE ET AL　　2,103,170
CLINKER COOLER
Filed Feb. 23, 1935
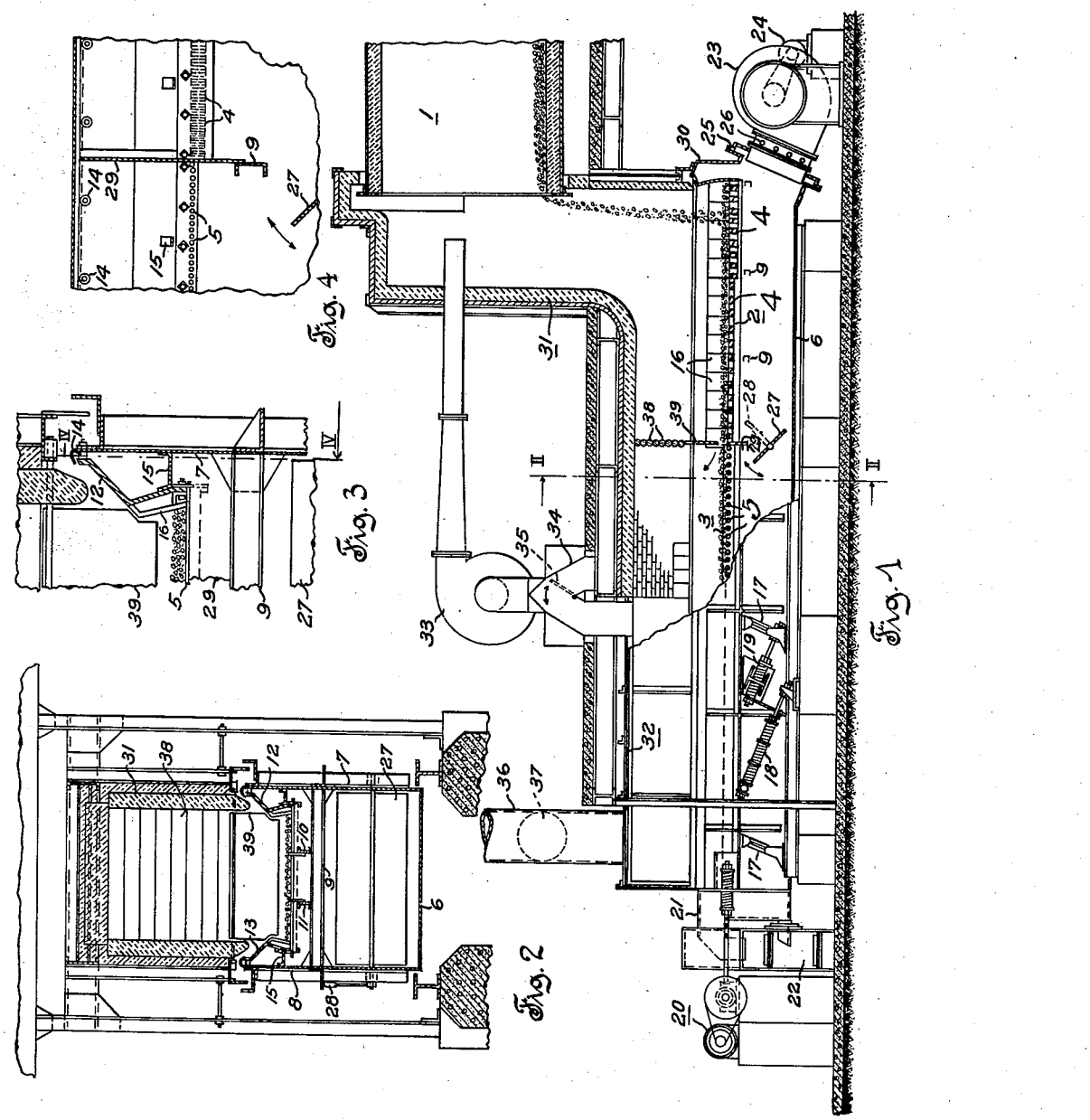
Inventor
R. C. Newhouse
B. H. Puerner
by G. J. D. Ellis
Attorney Patented Dec. 21, 1937

2,103,170

UNITED STATES PATENT OFFICE 2,103,170

CLINKER COOLER

Ray C. Newhouse, Wauwatosa, and Bertram H. Puerner, West Allis, Wis., assignors to Allis-Chalmers Manufacturing Company, Milwaukee, Wis., a corporation of Delaware Application February 23, 1935, Serial No. 7,686

10 Claims. (Cl. 34—38)

This invention relates to coolers for highly heated material such as cement clinker discharged from a kiln.

In an earlier application of R. C. Newhouse, Serial No. 629,769, filed August 22, 1932, which issued as Patent No. 2,055,940 on Sept. 29, 1936, an apparatus for cooling Portland cement clinker has been disclosed, wherein the clinker delivered from a kiln is spread out and advanced over a perforate support, and a vigorous blast of air is forced through the moving bed of clinker to effect rapid cooling. In the operation of coolers of this type certain difficulties have been encountered due to the fact that a cement burning kiln in normal operation delivers at times more clinker than at others, and that the size of the lumps of clinker varies considerably. If the rate of discharge from the kiln suddenly increases the moving bed of clinker is likely to increase in thickness, and at times the bed might be thicker at one portion than at others. The consequent result of such a condition is that most of the cooling air will rush through the thinnest portions of the bed and very little air will penetrate the thicker portions. A similar undesirable rush of air through certain portions of the bed may result if the bed contains one or more exceptionally large lumps of clinker. The irregular distribution of the cooling air over the bed of clinker not only impairs the cooling efficiency of the air, as will be readily understood, but it also interferes with the subsequent use which it is desired to make of said air after it has been heated through contact with the clinker. As disclosed in the mentioned earlier application, part of the cooling air which has been heated through contact with the hot clinker is introduced into the kiln as combustion air and the remaining part of the cooling air, after passing through the bed of clinker, is disposed of otherwise, the total quantity of air forced through the bed of clinker being much larger than that required for combustion purposes in the kiln. The amount of combustion air to be passed into the kiln is rather definitely fixed by the amount of fuel to be burned and by other operating requirements, and in order to maintain proper operation of the kiln the amount of the combustion air, particularly of the part thereof known as "secondary air", should be regulated so as to be always in conformity with the operating requirements of the kiln. In order to accomplish such regulation it is necessary to take into account the mentioned irregular distribution of the cooling air over the bed of clinker, for it is clear that, if the portion of the bed from which the combustion air is taken varies in thickness or resistance to penetration of air, the amount of air issuing from said portion will also vary, and provision must be made to deliver the desired proper amount of combustion air into the kiln under such varying conditions.

It is an object of the invention to control the distribution of cooling air over the moving bed of clinker so that a predetermined amount of heated air conforming with the combustion requirements of the kiln may be passed into the kiln under varying conditions of the moving bed as to thickness and/or resistance to penetration of air.

Another object of the invention is to make the whole available pressure of the fan delivering the cooling air effective to force cooling air through a predetermined portion of the bed, thus making it possible to force the desired amount of combustion air through said portion of the bed even if it should be substantially thicker than other portions of the bed.

A further object of the invention is to provide a simple, inexpensive and efficient mechanism for regulating the flow of cooling air through different portions of the moving bed of clinker.

A still further object of the invention is to improve the clinker cooler of the shaking conveyor type disclosed in said earlier application by providing novel means for preventing the egress of dust from the hood in which the cooling air collects after passing through the bed of clinker.

Still another object of the invention is to provide for improved cooling of side members retaining a bed of hot clinker on a perforate support.

These and other objects and advantages of the invention will be apparent from the following description. A clear conception of an embodiment of the invention and of the operation of a device constructed in accordance therewith, may be had by referring to the drawing accompanying and forming a part of this specification in which like reference characters designate the same or similar parts in the various views.

Figure 1 is a side view, partly in section, of a cooler for Portland cement clinker;

Fig. 2 is an enlarged section on line II—II of Fig. 1;

Fig. 3 is an enlarged view of a portion of Fig. 2, showing the dust seal between the shaking trough and the stationary hood; and Fig. 4 is a section on line IV—IV of Fig. 3.

The reference numeral 1 indicates the discharge end of a rotary kiln from which cement clinker is discharged directly into the cooler extending in the longitudinal direction of the kiln below the discharge end of the latter. The clinker falling over the edge of the rotary kiln drops upon a grate structure comprising a forward section 2 and a rearward section 3. The forward section 2 of the grate consists of cross bars 4 slightly spaced from each other to permit cooling air to pass upwardly through the spaces between the bars 4, the bars being somewhat sturdier at that portion of the grate which receives the impact of the falling clinker, as shown in Fig. 1. The rearward section 3 of the grate consists of transversely extending round steel rods 5 which, like the cross bars 4, are slightly spaced from each other to permit cooling air to pass upwardly through the spaces between the rods 5. The rearward section 3 of the grate is somewhat longer than the forward section 2 and is only partly visible in Fig. 1, the non-visible portion being indicated to a certain extent by dotted lines. The whole grate structure is mounted within a trough comprising a solid bottom portion 6 and side walls 7 and 8. A plurality of transverse channels 9 within the trough are secured to the side walls 7 and 8, as shown in Fig. 2, and the transverse channels support a pair of longitudinal channels 10 and 11 extending throughout the length of the trough. The longitudinal channels 10 and 11 provide a support for the transverse grate bars 4 and the transverse rods 5 intermediate the transverse width of the grate. Connected to opposite ends of the grate bars and extending upwardly therefrom are side plates 12 and 13 extending longitudinally of the grate and throughout the length of the trough. A lower portion of each side plate 12 and 13 extends in a plane inclined towards the longitudinal vertical central plane of the trough, and an upper portion of each side plate 12 and 13 is inclined in the opposite direction, as best shown in Fig. 3. The upper end of the side plate 12 terminates near the upper portion of the side wall 7 of the trough and is secured thereto in spaced relation by means of tubular spacers 14 and bolts extending through the spacers. The upper end of the side plate 13 is similarly secured to the upper portion of the side wall 8 of the trough. The lower, inwardly inclined portion of the side plate 12 is also spaced from the side wall 7 of the trough and a series of short, channel shaped spacers 15 hold the lower portion of the side plate 12 in fixed relation to the side wall 7 of the trough. Similar spacers 15 are arranged between the lower inwardly inclined portion of the side plate 13 and the side wall 8 of the trough. It will be seen that the relative arrangement of the side members 12 and 13 and the side walls 7 and 8 is such as to provide air ducts extending longitudinally of the trough throughout its length, the ducts communicating with the space below the grate so that air forced into the trough may pass upwardly through the ducts. The upper ends of the side walls 7 and 8 are bent over the upper edges of the side plates 12 and 13 whereby a longitudinal slot is formed at the upper end of each side wall 7 and 8, each slot affording an outlet for the air passing upwardly between the side walls 7 and 8 and the side plates 12 and 13.

In order to protect the side plates 12 and 13 from extremely high heat of clinker on the forward section 2 of the grate further air ducts are formed along these side plates by means of a series of plate members 16 associated with the inwardly inclined portion of the side plate 12 and by a similar series of plate members 16 associated with the inwardly inclined portion of the side plate 13. As shown in Fig. 1, the plate members 16 are arranged edge to edge along the forward section 2 of the grate structure, and as may be seen from Fig. 3, their lower edges rest on the cross bars 4 of the forward section of the grate, at a distance from the respective side plates with which they are associated. The top portions of the plates 16 form substantially continuations of the outwardly inclined portions of the side plates 12 and 13, and they are connected thereto by a welded seam or in any other manner affording a substantially air tight connection. The lower portions of the plates 16 are inwardly inclined like the lower portions of the side plates 12 and 13, but are spaced from the latter to form ducts into which air may enter from below through the spaces between the grate bars 4. The ducts so formed have open ends near the forward end of the rearward section 3, as may be seen from Fig. 1.

The entire trough including the grate structure is mounted for oscillating movement on upstanding, rearwardly inclined links 17, a spring mechanism 18 preventing collapse of the links, and other spring mechanism 19 associated with each upstanding link rendering the oscillating movement of the upstanding links resilient. A motor driven mechanism, generally indicated by 20, is connected to the trough for imparting oscillating movement to the latter so as to make it function as a shaking conveyor, as is more specifically described in the mentioned earlier application.

The cement clinker discharged from the kiln, as stated, falls directly upon the grate structure of the shaking trough, and while the latter is reciprocated by the mechanism 20 and clinker is continuously discharged from the kiln a floating stream or moving bed of clinker will form on the grate structure and advance towards the discharge spout 21 where it is suitably disposed of, preferably by a conveying mechanism generally indicated by 22.

Cooling air is forced into the trough by a fan 23 driven by an electric motor 24. The discharge pipe of the fan projects into the trough below the grate and adjacent the end of the latter where the clinker is received from the kiln. The fan is stationarily mounted, and in order to permit movement of the shaking trough relative to the discharge pipe of the fan a sliding connection 25 is provided, the connection being substantially air tight. A shutter 26 is arranged in the discharge pipe of the fan as it is desirable at times to throttle the blast of the fan, for instance, when starting up the kiln and cooler.

Intermediate the ends of the trough and below the grate structure a damper 27 is rotatably mounted in the side walls 7 and 8 of the trough. The damper extends all the way across between the side walls, and its width transversely to its axis of rotation is substantially equal to the distance between the bottom 6 of the trough and the lower surface of the channel 9 at the rear end of the forward section 2 of the grate. An operating lever 28 is mounted on the shaft of the damper outside of the trough, the shaft having sufficient friction in its bearings to hold the damper in any adjusted position. In the position of the damper shown in Fig. 1 the air forced into the portion of the trough below the forward section 2 of the grate will be somewhat restricted from entering the portion of the trough below the rearward section 3 of the grate. In order to make the control of the communication between the two mentioned portions of the trough by means of the damper complete a partition 29 is provided in the trough above the damper, as more clearly shown in Figs. 3 and 4. The partition 29 has a lower portion extending between the side walls 7 and 8 of the trough along the channel 9 above the damper, thus sealing the space between the upper edge of said channel and the lower surface of the grate. Adjacent the side walls 7 and 8 the partition 29 is extended upwardly so as to seal the space between said side walls and the side plates 12 and 13. It will be seen that with this arrangement the rearward portion of the trough below the rearward section 3 of the grate may be practically shut off from the forward portion of the trough below the forward section 2 of the grate by closing the damper. It is possible, therefore, by manipulation of this single damper 27 to make the whole available pressure of the fan 23 effective to force cooling air through the forward section 2 of the grate structure, it being of course understood that the end of the trough into which the discharge pipe of the fan 23 projects is closed by suitable wall portions 30 so that there will be no outlet for the air at this end of the trough. The opposite end of the trough near the discharge spout 21 is similarly closed as will be obvious.

A hood for collecting the air passed through the grate structure and the moving bed of clinker thereon is arranged above the shaking trough. The hood is stationary and comprises a fire-brick portion 31 and a plate metal portion 32. The fire-brick portion communicates with the kiln 1 in well known manner to provide an inlet for secondary combustion air while the primary combustion air is drawn from the plate metal portion 32 of the hood by means of a fan 33. A branch 34 of the intake of the primary air fan communicates with atmospheric air outside of the hood, and a damper 35 may be adjusted to either take all the primary air from the hood or from atmosphere, or partly from the hood and partly from atmosphere. Near the discharge end of the cooler a stack 36 controlled by a damper 37 communicates with the plate metal portion 32 of the hood to lead off excess air.

Within the brick portion of the hood above the grate structure and directly opposite the damper 27 of the trough a partition is provided to compel a substantial portion of the air penetrating the forward section 2 of the grate to enter the kiln. The upper portion of the partition consists of a series of silicon carbide tubes 38 extending between the side walls of the hood as shown in Fig. 2, and the lower portion of the partition consists of a plate 39 pivotally suspended between the side walls of the hood and extending into the space between the side plates 12 and 13 of the shaking conveyor. The lower transverse edge of the plate 39 is well spaced from the upper surface of the grate so that the moving bed of clinker normally does not hit the plate. However, if a large lump of clinker comes along it will hit the plate and the latter will swing from its perpendicular position to allow the lump to pass.

In operation the amount of combustion air passing into the kiln, and particularly the amount of the secondary air, should be regulated, as has been stated, to be in conformity with the operating requirements of the kiln. Assuming that the kiln discharges clinker at a uniform rate and of substantially uniform size, a certain amount of secondary air will pass into the kiln through the forward section 2 of the grate, the amount of said air depending from the speed of the fan 23, the position of the damper 27, and the speed of advancement of the conveyor which is controlling for the thickness which the bed of clinker will assume at a given rate of discharge from the kiln. The damper 27 affords a convenient means for varying the amount of the secondary air passing into the kiln, for it is clear that, at a given thickness of the bed, a maximum amount of secondary air will pass into the kiln if the damper is closed and a minimum amount of secondary air will pass into the kiln if the damper is open. As has been stated hereinbefore, the rate at which the kiln discharges clinker in normal operation, is not uniform, nor is the size of the lumps of clinker uniform. At a constant speed of the conveyor, and a constant speed of the fan 23, and without regulation of the damper 27, the amount of secondary air passing through the forward section 2 of the grate will therefore vary considerably and contrary to the requirements of the kiln. If the bed of clinker on the forward section 2 of the grate becomes thicker due to a temporary increase of discharge from the kiln, less air will penetrate said forward section and more air will penetrate the rearward section 3 of the grate. Similarly, if the uniformity of the bed is disturbed by one or more exceptionally large lumps of clinker, more air is likely to rush through the rearward section than through the forward section after the lumps have been advanced upon the rearward section. The resulting deficiency of secondary air may easily be compensated by throttling the flow of air from the forward portion of the trough into the rearward portion by means of the damper 27, and in extreme cases the damper may be closed entirely and the full pressure of the fan 23 will then be effective to force air through the forward section 2 of the grate. On the other hand, if the bed of clinker on the forward section of the grate becomes thinner due to a temporary decrease of discharge from the kiln more air will penetrate said forward section and less air will penetrate the rearward section of the grate. A similar disturbance may result if one or more exceptionally large lumps of clinker are advanced over the forward section of the grate, and in either case the resulting surplus of secondary air may be checked by opening up the damper 27. Also disturbances of the uniformity of the bed, which may be more pronounced in a traveling chain type of conveyor due to the fact that a heap of clinker may be advanced over the grate, may be conveniently compensated for by proper manipulation of the damper 27.

Referring again to the side plates 12 and 13 of the grate structure, it should be noted that due to the inclination of the lower portions of these plates the air penetrating the grate structure is directed towards the center of the trough, which is desirable in order to protect the lower edges of the hood projecting into the trough, as shown in Fig. 2, to a certain extent from the hot blast of air. The air forced through the longitudinal slots at the upper edges of the trough also tends to protect these edges of the hood from the hot blast, but a more significant function of the air escaping through these slots is to prevent the egress of dust from the space under the hood and above the moving bed through the gaps between the upper edges of the shaking trough and the adjacent portions of the stationary hood.

As to the ducts formed by the plate members 16 it should be noted that some of the air forced into the portion of the trough below the forward section 2 of the grate may freely enter the ducts through the spaces between the grate bars 4 which are not covered by clinker, and that a substantially horizontal flow of air will be maintained through these ducts, the air entering the ducts being discharged therefrom above the rearward section 3 of the grate and not compelled to any considerable extent to penetrate the bed of clinker. If the damper 27 is closed there will be a more substantial flow of air through these ducts than when the damper is open.

It should be understood that it is not intended to limit the invention to the exact details of construction shown and described hereinbefore, for various modifications within the scope of the claims may occur to persons skilled in the art.

It is claimed and desired to secure by Letters Patent:

1. In a shaking conveyor, a shaking trough having a solid bottom and longitudinal side walls extending upwardly from said bottom, partition members within said trough extending in the direction of said side walls and transversely spaced from the latter, a grate structure between said partition members and spaced from said bottom, the space within said trough below said grate structure communicating with the spaces between said side walls and said partition members, and the latter spaces communicating with the space above said grate structure through narrow slots extending longitudinally of the trough near the upper edges of said side walls whereby a major portion of a gaseous fluid forced into said space below said grate may escape therefrom through the perforations of the latter while a minor portion may escape through said slots.

2. In a cooler, a perforate support for a bed of material to be cooled, means including blast mechanism for passing a current of cooling fluid through said support and bed of material thereon, and hollow side members associated with said perforate support for retaining said bed of material thereon, said hollow side members communicating with said blast means to maintain a flow of cooling fluid therethrough.

3. In a cooler, a perforate support for a bed of material to be cooled, means including a duct below said perforate support for passing a current of cooling fluid upwardly through said support, and hollow side members associated with said perforate support for retaining said bed of material thereon, said hollow side members communicating with said duct and being cooled by cooling fluid entering said duct and passing through said hollow side members.

4. In a cooler, a perforate support for a bed of material to be cooled, means including a duct extending along said perforate support for passing a current of cooling fluid through said support and bed of material thereon, means for setting up relatively high and low pressures of cooling fluid in different portions of said duct, and hollow side members associated with said perforate support for retaining said bed of material thereon, said hollow side members communicating with the high pressure portion of said duct and being cooled by cooling fluid passing therethrough.

5. In combination, a shaking trough having a solid bottom and a perforate false bottom above said solid bottom, a stationary housing arranged to form a hood over said shaking trough and being spaced therefrom by longitudinal gaps permitting oscillation of said trough relative to said housing, means reciprocable with said trough providing air passages along the longitudinal sides of said trough and in communication with the space between said solid and false bottoms within said trough, and means for blowing a gaseous fluid into said space between said solid and false bottoms, said air passages having longitudinal slots adjacent said gaps disposed to direct fluid issuing from said slots into the space above said false bottom through said gaps.

6. In combination, a shaking trough having a solid bottom and side walls extending upwardly from said bottom, a perforate false bottom within said shaking trough above said solid bottom and below the upper edges of said side walls, a stationary housing arranged to form a hood over said shaking trough and having side walls projecting into said trough in laterally spaced relation to said side walls thereof, means reciprocable with said shaking trough providing air passages along said side walls of said trough in communication with the space between said solid and false bottoms, and means for blowing a gaseous fluid into said space between said solid and false bottoms, said air passages having slots along the upper longitudinal edges of said side walls of said trough, disposed to direct the fluid issuing from said slots into the space above said false bottom through the spacings between said longitudinal side walls of said trough and said housing.

7. In combination, a kiln, a conveying mechanism including a perforate support arranged to receive clinker from said kiln and advance it in the form of a moving bed from a charge end towards a discharge end of said support, a duct extending below said support between said charge and discharge ends thereof, adjustable flow check means within said duct intermediate said charge and discharge ends of said support and adapted to substantially prevent air communication, below said support, between first and second portions of said duct extending, respectively, between said charge end of said support and said flow check means, and between said flow check means and said discharge end of said support, air blast means in direct communication with said first portion of said duct and adapted to supply a flow of air in excess of the combustion requirements of said kiln, and a hood in communication with said kiln and arranged over the portion of said perforate support extending between said charge end of the latter and said flow check means.

8. In combination, a kiln, a conveying mechanism including a perforate support arranged to receive clinker from said kiln and advance it in the form of a moving bed from a charge end towards a discharge end of said support, a duct extending below said support between said charge and discharge ends thereof, adjustable flow check means within said duct intermediate said charge and discharge ends of said support, the portion of said duct between said charge end of said support and said flow check means forming an air chamber longitudinally of said support undivided transversely to the direction of advancement of said bed, and said flow check means being adapted to substantially prevent air communication between said air chamber and the portion of said duct extending between said flow check means and said discharge end of said support, air blast means in direct communication with said air chamber and adapted to supply a flow of air in excess of the combustion requirements of said kiln, and a hood in communication with said kiln and arranged over the portion of said perforate support extending between said charge end of the latter and said flow check means.

9. In combination, a kiln, a conveying mechanism including a perforate support arranged to receive clinker from said kiln and advance it in the form of a moving bed from a charge end towards a discharge end of said support, a duct extending below said support between said charge and discharge ends thereof, adjustable flow check means within said duct intermediate said charge and discharge ends of said support, the portion of said duct between said charge end of said support and said flow check means, and the portion of said duct between said flow check means and said discharge end of said support, each forming an air chamber longitudinally of said support undivided transversely to the direction of advancement of said bed, and said flow check means being adapted to substantially prevent air communication between said air chambers, air blast means in direct communication with the portion of said duct between said charge end of said support and said flow check means, and adapted to supply a flow of air in excess of the combustion requirements of said kiln, and a hood in communication with said kiln and arranged over the portion of said perforate support extending between said charge end of the latter and said flow check means.

10. In combination, a kiln, a conveying mechanism including a perforate support arranged to receive clinker from said kiln and advance it in the form of a moving bed from a charge end towards a discharge end of said support, air distributing means including an adjustable flow check element, below said support, providing a first air chamber having an aperture covered by a portion of said support extending between said charge end of the latter and an intermediate portion thereof, and a second air chamber having an aperture covered by a portion of said support extending between said intermediate portion of the latter and said discharge end thereof, said adjustable flow check element being adapted to substantially prevent air communication, below said support, between said first and second air chambers, air blast means in direct communication with said first air chamber and adapted to supply a flow of air in excess of the combustion requirements of said kiln, and a hood in communication with said kiln and arranged over the portion of said support extending between said charge end and said intermediate portion thereof.

RAY C. NEWHOUSE.
BERTRAM H. PUERNER.